Dec. 6, 1960  R. T. MASSENGILL  2,962,752
MEAT CUTTING APPARATUS
Filed Feb. 5, 1958  3 Sheets-Sheet 1
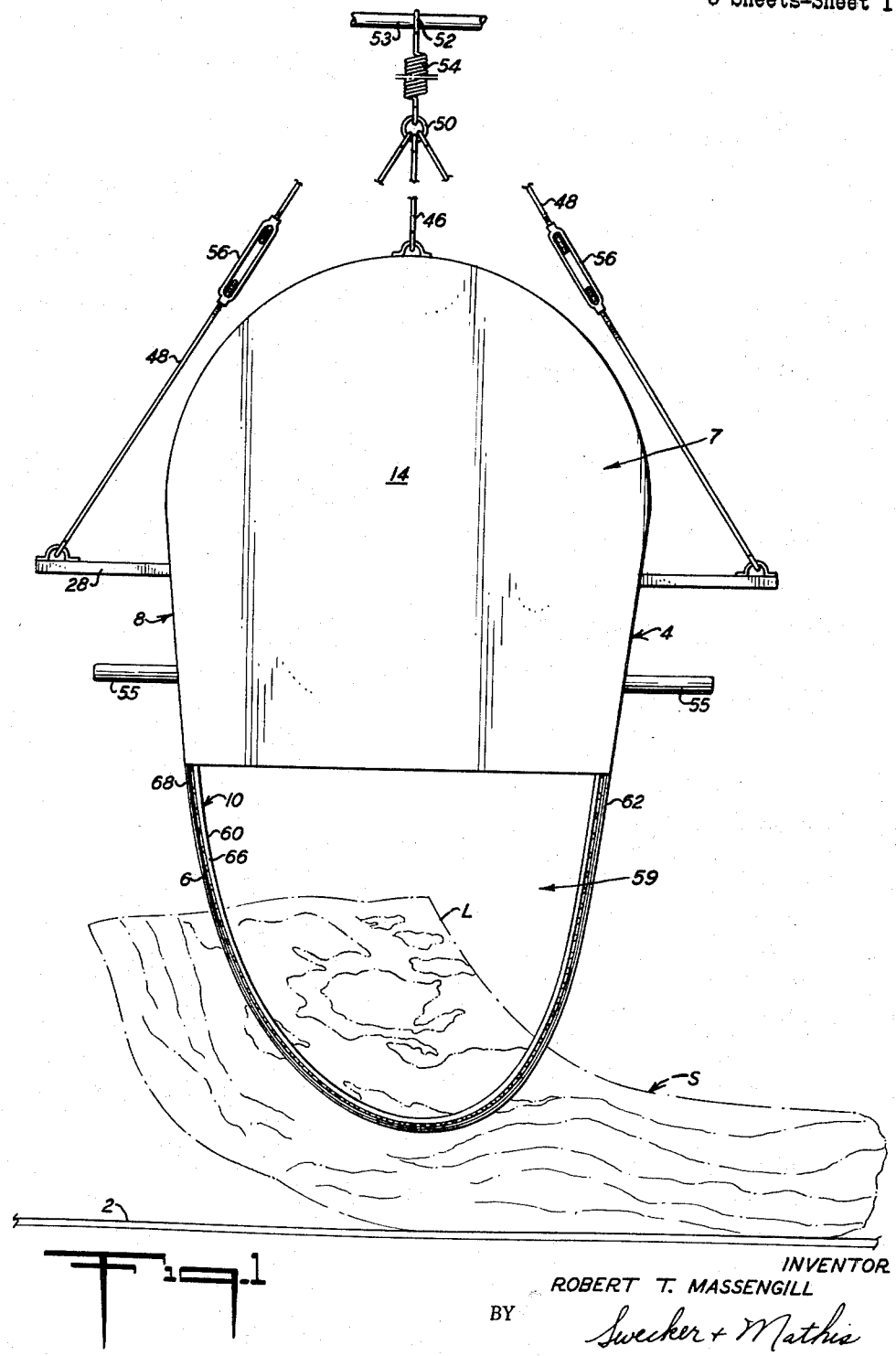
INVENTOR
ROBERT T. MASSENGILL
BY
Swecker + Mathis
ATTORNEYS

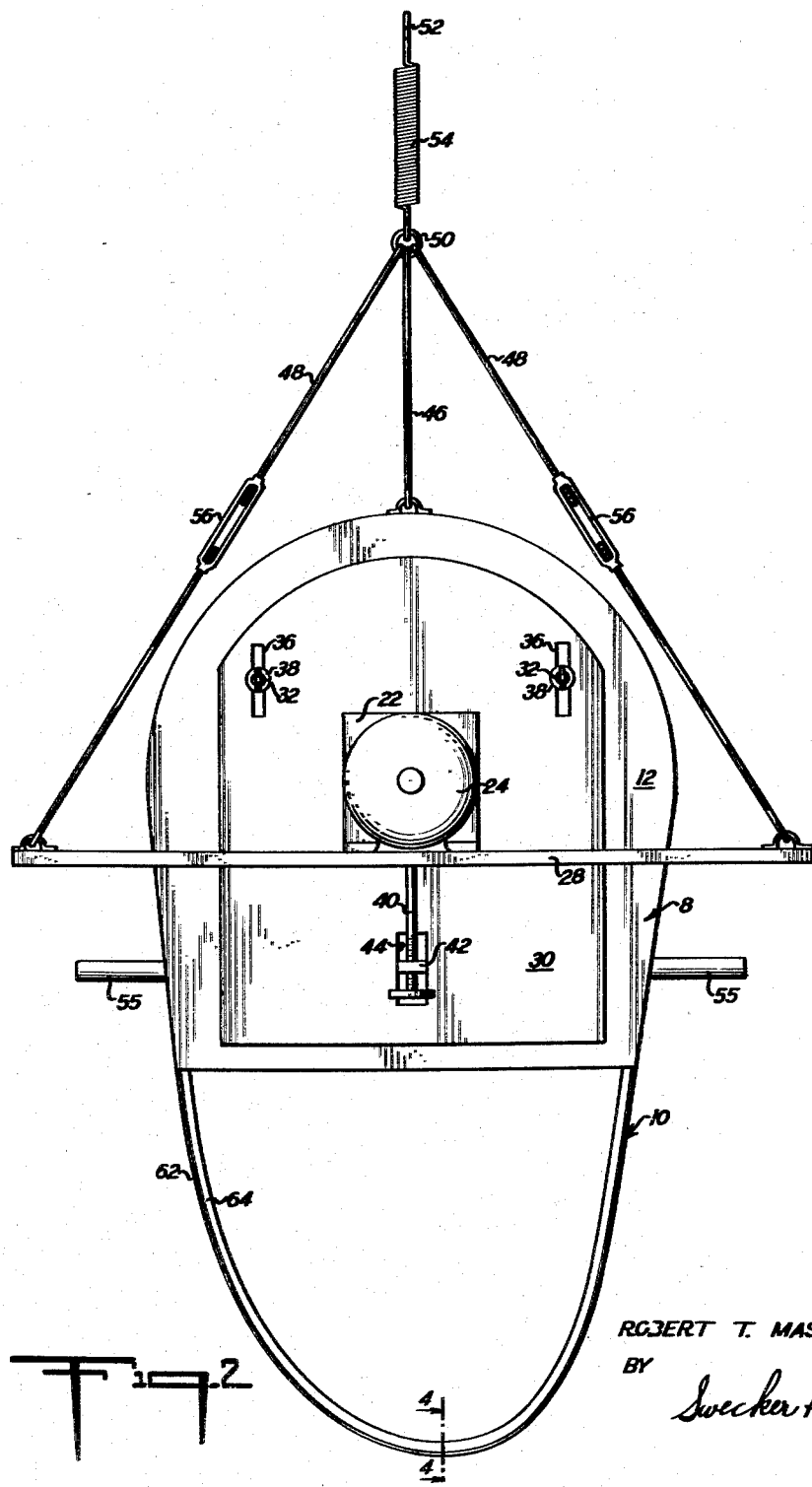

Dec. 6, 1960  R. T. MASSENGILL  2,962,752
MEAT CUTTING APPARATUS
Filed Feb. 5, 1958  3 Sheets-Sheet 3
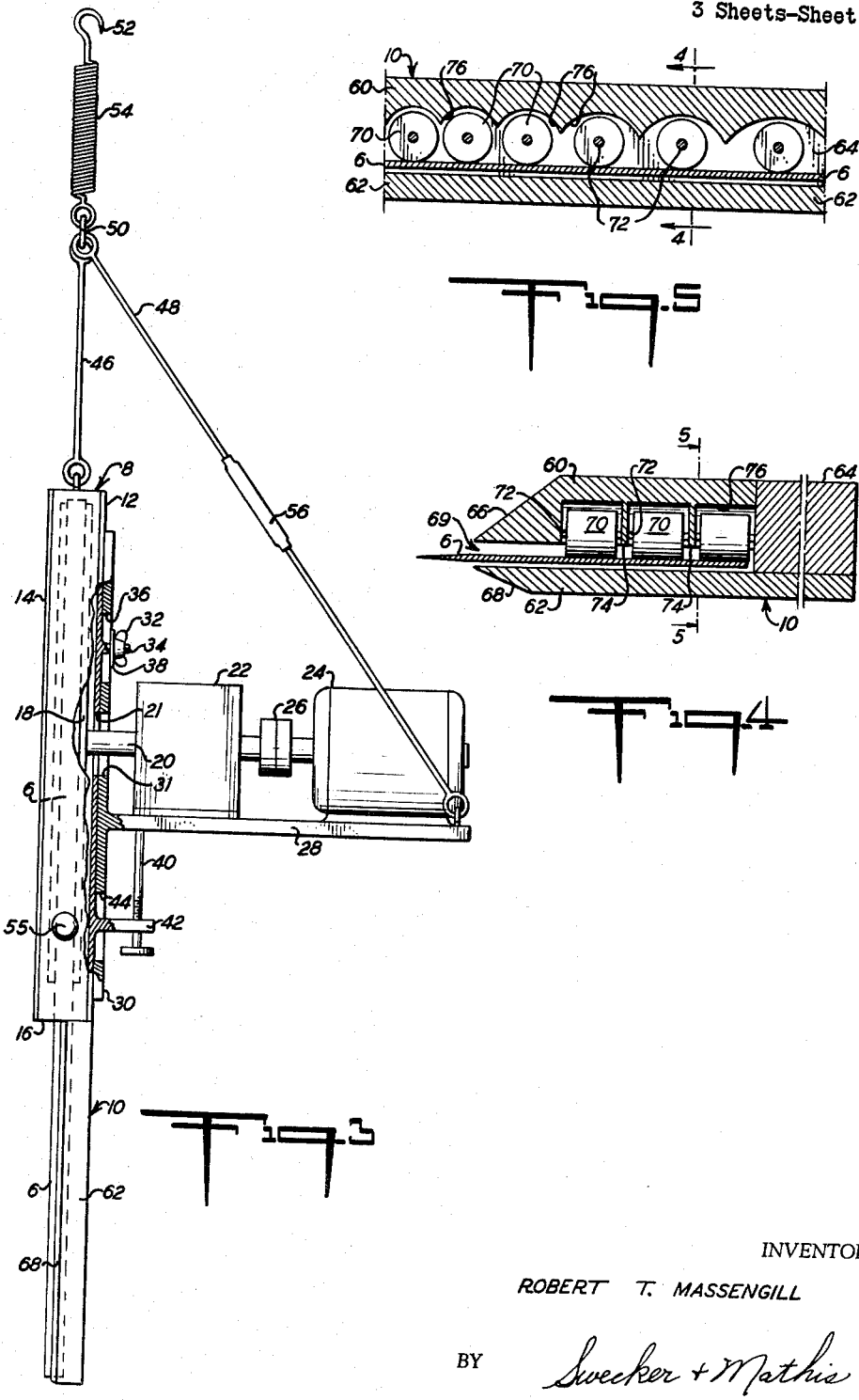
INVENTOR
ROBERT T. MASSENGILL
BY Swecker + Mathis
ATTORNEYS United States Patent Office 2,962,752
Patented Dec. 6, 1960

2,962,752
MEAT CUTTING APPARATUS
Robert T. Massengill, 8817 S. Throop St., Chicago, Ill.
Filed Feb. 5, 1958, Ser. No. 713,494
9 Claims. (Cl. 17—1)

This invention relates to meat cutting apparatus, and more particularly, to a power driven meat cutter for removing loins or ribs from sides of pork, beef, mutton, or the like.

In the processing of meat on a commercial basis, it is usual to divide a carcass of a slaughtered animal into a number of large sections which are given certain preliminary treatments while intact. Then these large sections are subdivided into the various cuts of meat normally used in the marketing of meat products. The cuts known as "loins" and "ribs" are the cuts with which the present invention is most directly concerned. These are similar cuts, and they are removed from the "sides" of animal carcasses.

For many years prior to the present invention, the ordinary procedure for removing loins from sides of meat involved the use of a hand-operated knife of the type shown in United States Patent No. 431,097, granted on July 1, 1890, to Fred. W. Wilder. The sides of meat were delivered to a cutting station by a conveyer extending from the cooling room of the meat processing plant. At the cutting station, one attendant, standing on one side of the conveyer belt, would bring a hook into engagement with the meat to hold the meat on the conveyer. A second attendant, standing on the opposite side of the conveyer, then would pull a curved knife blade through the meat to sever the loin therefrom.

Even under the most favorable conditions, the force required to operate a conventional loin knife is very large. Moreover, the chilled meat on the conveyer belt extending from the cooling room often will be partially frozen. In such instances, the difficulties encountered in pulling a conventional loin knife through a side of meat are further aggravated.

An indication of the inefficiency of the present practice may be found in the fact that some plants have found it necessary to employ two loin knife operators at each cutting station. These men work in alternation as the sides of meat move along the conveyer. While one of these operators is actively engaged in pulling his loin knife through a side of meat, the other is resting in an attempt to recover from the exertion previously experienced in pulling his own loin knife through a side of meat.

It is a primary object of this invention to overcome the disadvantages noted above by providing meat cutting apparatus which can be operated easily and efficiently to remove pieces of meat from larger bodies of meat.

A more specific object of this invention is to provide a power driven band knife so mounted adjacent a meat conveyer that it may be moved across the conveyer to sever meat carried by the conveyer.

Another object of this invention is to provide an improved band knife which may be employed to produce curved cuts in bodies of meat.

Still another object of this invention is to provide an improved band knife construction in which the knife blade is supported and guided along a fixed path in the zone in which a meat-cutting operation is to be performed.

The foregoing objects may be accomplished, according to one embodiment of the invention, by providing a meat cutter in which a flexible endless knife blade is driven along a closed path including a curved portion. In the curved portion of the path of the blade, the apparatus is provided with a plurality of rollers which engage the inside surface of the blade to guide the blade along its predetermined path of movement. The cutter also is provided with suitable guard means adjacent the curved portion of the path of the blade to enclose all but the cutting edge of the blade in this zone, and the cutter is open on both sides of the blade path in this zone to permit the passage of the cutter through the meat being cut thereby.

This meat cutter preferably is suspended in a flexible manner from an overhead support adjacent to a conveyer along which sides of meat to be cut may pass. When a side of meat moves into position with respect to the cutter, an operator may grasp the cutter and move it laterally across the path of the conveyer and through the meat supported on the conveyer.

One of the problems involved in the provision of an efficient band knife for cutting meat is that there is a tendency for grease to collect on the parts of the cutter. The most economical way of driving a band knife is through the frictional forces developed between a surface of the knife blade and the periphery of a drive wheel. However, when this method is employed, the presence of substantial quantities of grease on the knife blade tends to reduce the friction between the blade and its drive wheel so that the blade tends to slow down, or even stop, during use. Moreover, large deposits of grease adjacent the guide means for the blade of a band saw increase the resistance of the blade to movement through its intended path, thereby further increasing the tendency of the blade to slow down.

These factors are dealt with in the preferred embodiment of the present invention by minimizing the frictional resistance offered by the guides which establish the path of the band knife, by guarding the cutting portion of the path of the knife in such a way that the collection of grease is minimized, and by mounting the drive wheel for the band knife upon the frame of the cutter in such a manner that it may be adjusted as necessary to increase or decrease the tension on the blade. When the tension is increased, the pressure of the knife against the wheel also is increased so as to compensate for any diminution of the coefficient of friction between the knife and the wheel due to the presence of grease on the surfaces of these parts.

A better understanding of the construction of this embodiment of the invention will be gained from a consideration of the following detailed description of the embodiment thereof illustrated in the accompanying drawings, in which:

Fig. 1 is a front elevational view of the meat cutting apparatus;

Fig. 2 is a rear elevational view of the apparatus shown in Fig. 1;

Fig. 3 is a side elevational view of the apparatus shown in Fig. 1 with certain parts being broken away;

Fig. 4 is a detail cross sectional view on a larger scale than Fig. 2 taken along the lines 4—4 in Figs. 2 and 5; and Fig. 5 is a detail cross sectional view taken along the line 5—5 in Fig. 4.

In Fig. 1, a side of pork S and a conveyor belt 2 for supporting it have been illustrated in dot-dash lines to suggest the positional relationship which may exist when a meat cutter 4 constructed in accordance with the present invention is employed to sever a loin L from the side of pork S. Such a cutting operation will be described in greater detail hereinafter.

The cutter 4 includes a smooth endless band knife blade 6 of flexible steel mounted upon a frame 7 composed of an upper section 8 and a lower section 10. The upper section 8 of the frame provides an enclosure for the upper portion of the path of movement of the blade 6, and the lower section 10 of the frame provides guide or bearing means for controlling the movements of the blade 6 through that portion of its path in which cutting takes place.

The enclosure provided by the upper section 8 of the frame is formed by a rear wall 12, a front wall or cover member 14, and a side wall or stationary guard member 16 extending between the rear wall 12 and the front wall 14 at the outer edge of the top section 8. These parts may be secured together in any suitable manner.

A drive wheel 18 is disposed within the upper section 8 of the frame in spaced relation with respect to the inner faces of the walls 12, 14, and 16. The circumferential face of the drive wheel 18 engages the inner face of the endless knife blade 6 over a substantial arc, and friction between the contacting faces of the wheel 18 and the blade 6 provides the necessary force for moving the blade 6 when the wheel 18 is rotated about its central axis.

The wheel 18 is mounted upon and driven by a shaft 20 which extends rearwardly through a vertically elongated slot 21 in the rear wall 12 of the frame to a conventional gear box 22. Power may be supplied to the gear box 22 from an electric motor 24, through a suitable clutch 26.

In order that the vertical position of the drive wheel 18 may be adjusted to regulate the tension in the knife blade 6, the gear box 22 and the motor 24 preferably are mounted upon a vertically movable platform 28. The platform 28 is integral with, or rigidly connected to, a slide member 30 disposed in face-to-face contact with the rear wall 12 and provided with a suitable opening 31 therein for receiving the shaft 20. A plurality of wing nuts 32 normally serve to hold the platform 28 against movement relative to the rear wall 12, but these may be loosened when adjustments are required.

The wing nuts 32 are mounted upon threaded studs 34 which project rearwardly from the wall 12 through elongated slots 36 in the slide member 30. Suitable washers 38 may be interposed between the rear face of the slide member 30 and the wing nuts 32 to increase the bearing area for the forces applied by the nuts 32.

A screw 40 located below the platform 28 serves to control the vertical movements of the platform 28 when the wing nuts 32 are loosened. The screw 40 is threadedly mounted in a rearwardly projecting stud 42 integral with, or rigidly connected to, the wall 12. An elongated slot 44 in the slide member 30 permits vertical movements of the slide member 30 relative to the stud 42 during adjusting operations, and it is preferred that the width of the slot 44 be such that its side walls may bear against the side faces of the stud 42 to prevent twisting movements of the slide member 30. The upper end of the screw 40 bears against the lower surface of the platform 28 so that, upon upward movement of the screw 40, the platform 28 is elevated, and upon downward movement of the screw 40, the platform 28 is permitted to descend by gravity.

The entire cutter unit 4 preferably is supported by a bridle made up of wires or rods 46 and 48 connected together at their upper ends by a ring 50 or other suitable means. As illustrated, the front rod 46 of the bridle is connected to the top of the guard wall 16, and the two rear rods 48 are connected to the platform 28.

The ring 50 of the bridle is connected to a hook member 52 which may be suspended from a suitable overhead support such as the rod 53 shown in Fig. 1 of the drawings. In order that the cutter unit 4 may be manipulated as necessary to position the cutting run of the knife blade 6 properly with respect to the side of meat S being cut, it is preferred that the connections between the bridle and the hook 52 include a flexible element such as a coil spring 54, and the upper section 8 of the frame is provided with a pair of handles 55.

As will be evident, each change in the vertical position of the platform 28 relative to the rear wall 12 results in a change in load distribution pattern in the bridle formed by the members 46, 48 and 50. Normally, this change will not be significant, but turnbuckles 56, or the like, may be included in the bridle to facilitate the making of such compensating adjustments as may be desired by the operator of the apparatus.

As illustrated in Figs. 1 and 2, the lower section 10 of the frame is provided with a large opening 59, and the interior of the lower section 10 of the frame of the cutter unit 4 is substantially open and unobstructed, to permit movement of the unit through a side of meat S being cut thereby. The only portions of the frame section 10 which need bear against the meat are a narrow inner wall 60 and a thin outer guard wall 62, and the front faces of these members are tapered away from the path of movement of the knife blade 6 as indicated by the numerals 66 and 68, respectively.

Referring particularly to Figs. 4 and 5, it will be seen that the inner wall 60 of the lower section 10 of the frame is connected to the guard wall 62 through an end member 64. These parts may be connected together in any suitable manner. The front end portion of the inner wall 60 approaches the outer guard 62 closely to give the blade passageway 69 a narrow entrance end which tends to exclude therefrom grease, meat particles, and the like. However, the inner wall 60 is cut away just beyond the front end thereof to provide the passageway 69 with an enlarged portion for receiving a plurality of guide rolls 70 rotatably mounted upon spindles 72 fixed to the inner wall 60 and to the end member 64. Each of the spindles 72 carries three of the rollers 70, and each spindle 72 is supported intermediate adjacent ones of the rollers of the group by partitions 74 rigid with the main body of the inner wall 60 of the frame. It has been found in practice, that the frictional resistance offered by a group of rollers mounted upon a common spindle is substantially less than that offered by a single roller. For this reason, the construction illustrated in Fig. 4 is preferred for use in the present invention.

The groups of coaxial guide rollers 70 are arranged in a curved series which extends throughout the length of the lower section 10 of the frame. The spacing between adjacent groups of guide rollers 70 in the series varies somewhat, as suggested in Fig. 5, in accordnace with the curvature of the blade path. In zones where the blade path is curved to a substantial degree, the groups of guide rollers 70 should be closely spaced from each other, but in zones where the blade path is substantially straight, adjacent ones of the groups of rollers 70 may be spaced farther apart.

Accumulations of grease and other foreign matter in the vicinity of the rollers 70 may be minimized by forming curved roller seats 76 in the inner wall member 60 of the frame section 10. The peripheral surfaces of the individual rollers 70 cooperate with the curved seats 76 to throw out foreign matter and to keep the blade passageway 69 clear. By keeping the blade passageway 69 clear, the frictional resistance of the blade 6 to movement along its intended path is minimized, and the driving force imparted to the blade 6 by the drive wheel 18 need not be large as might otherwise be required.

By way of summary, it may be helpful to describe briefly the manner in which the present invention may be employed to remove a loin L from a side of meat S. Initially, the cutter unit 4 will be disposed to one side of the conveyor belt 2 with the sharpened edge of the knife blade 6 directed toward the conveyor 2, and the operator will be stationed on the opposite side of the conveyor belt 2. The motor 24 may run continuously, or it may be energized just prior to each cutting operation to be performed by the apparatus. In either event, it may be assumed that when the side of meat S reaches a position adjacent the cutter unit 4, the blade 6 will be moving rapidly along a closed path defined by the drive wheel 18 and the guide rollers 70.

The operator grasps the handles 55 protruding from the sides of the frame of the cutter unit 4 to shift the cutter unit 4 downwardly, laterally, or in whatever other direction may be required in order to locate the curved lower portion of the path of the blade 6 properly with respect to the side of meat S. Then, he pulls the entire unit 4 toward him so as to move the knife blade through the side of meat S. During this pulling movement, the inclined faces 66 and 68 of the wall sections 60 and 62 of the lower frame section 10 exert a wedging action upon the meat immediately adjacent to the cut formed therein by the blade 6, and the cut is opened sufficiently to permit the passage of the lower section 10 of the frame through the meat. The loin L served from the side of meat S passes through the large central opening in the lower section 10 of the frame, and may be removed from the conveyor 2 if desired.

Although a single embodiment of the invention has been illustrated and described in detail, various modifications and alterations will be apparent to persons skilled in the art. It is intended, therefore, that the foregoing description be considered as exemplary only, and that the scope of the invention be ascertained from the following claims.

I claim:

1. The combination with a conveyor for moving a body of meat along a predetermined path and a stationary support member near said path, of a meat cutter for making a curved cut in a body of meat and resilient means connecting said meat cutter to said stationary support to permit movement of said meat cutter across said path, said meat cutter comprising an endless flexible knife blade, means operatively associated with said blade for supporting and guiding said blade for movement along a closed path having a curved portion, said means for supporting and guiding said blade being open on both sides of the curved portion of the path of said blade to permit passage of said blade through the body of meat, and means operatively connected with said blade for driving said blade along said closed path.

2. Meat cutting apparatus for making a curved cut in a body of meat comprising a frame, a rotatable drive wheel on said frame, an endless flexible knife blade having a portion of its inner surface disposed in contact with the periphery of said drive wheel and being of greater length than the circumference of said drive wheel, bearing means on said frame at a location spaced from said drive wheel and contacting the inner surface of said blade, said bearing means having portions thereof forming a curved path for guiding the portion of said blade contacted thereby through said curved path, and said frame being provided with an opening therein adjacent said bearing means on the inside of said curved path of said blade through which a piece of meat severed from the body of meat by said blade may pass, and means connected to said drive wheel for rotating said wheel to drive said blade along said path.

3. Meat cutting apparatus for making a curved cut in a body of meat comprising a frame, a rotatable drive wheel on said frame, an endless flexible knife blade having a portion of its inner surface disposed in contact with the periphery of said drive wheel and being of greater length than the circumference of said drive wheel, bearing means on said frame at a location spaced from said drive wheel and contacting the inner surface of said blade, said bearing means having portions thereof forming a curved path for guiding the portion of said blade contacted thereby through said curved path, and said frame being provided with an opening therein adjacent said bearing means on the inside of said curved path of said blade through which a piece of meat severed from the body of meat by said blade may pass, means on said frame for adjusting the distance between said wheel and said bearing means to regulate the tension in said blade, and means connected to said drive wheel for rotating said wheel to drive said blade along said path.

4. Meat cutting apparatus for making a curved cut in a body of meat comprising a frame, a rotatable drive wheel on said frame, an endless flexible knife blade having a portion of its inner surface disposed in contact with the periphery of said drive wheel and being of greater length than the circumference of said wheel, bearing means on said frame at a location spaced from said wheel and disposed in contact with the inner surface of said blade, said bearing means having portions thereof forming a curved path for guiding the portion of the blade contacted thereby through said curved path, said frame being provided with an opening adjacent said bearing means on the inside of said curved path through which a piece of meat severed from said body of meat by said blade may pass, means connected to said wheel for rotating said wheel to drive said blade along said path, a stationary guard mounted on said frame adjacent the outer surface of said blade, and a cover member mounted on said frame in covering relationship with respect to said drive wheel and that portion of said blade disposed in contact with said wheel.

5. Meat cutting apparatus for making a curved cut in a body of meat comprising a frame, a rotatable drive wheel on said frame, an endless flexible knife blade having its inner surface disposed in contact with the periphery of said drive wheel and being of greater length than the circumference of said drive wheel, means on said frame defining a curved blade-receiving passageway spaced from said wheel, a portion of said blade being disposed within said passageway with its cutting edge protruding from one side of said passageway, said frame being provided with an opening therein adjacent said means through which a piece of meat severed from the body of meat by said blade may pass, said means being tapered rearwardly adjacent said passageway to facilitate movement of said means through the cut formed by the cutting edge of said blade, bearing means in said passageway contacting the inner surface of said blade and having portions thereof forming a curved path for guiding the portion of the blade contacted thereby through said curved path, and means connected to said wheel for rotating said wheel to drive said blade.

6. Meat cutting apparatus for making a curved cut in a body of meat comprising a frame, a rotatable drive wheel on said frame, a curved series of guide rollers mounted on said frame at a location spaced from said drive wheel and with their axes extending generally parallel to the axis of rotation of said drive wheel, an endless flexible blade having its inner surface disposed in contact with a portion of the periphery of said drive wheel and rollers, said frame being provided with an opening therein adjacent said guide rollers on the inside of the path of movement of said blade for receiving a piece of meat severed from the body of meat by said blade, and means connected to said drive wheel for rotating said drive wheel to drive said blade along said path.

7. Meat cutting apparatus comprising a frame, a rotatable drive wheel on said frame, an endless flexible knife blade disposed in contact with a portion of the periphery of said blade, a plurality of independently rotatable guide rollers mounted on said frame in position to contact the inside surface of said blade at a location spaced from said drive wheel to guide said blade through the meat cutting portion of its path, said guide rollers being arranged in groups of coaxial rollers and said groups being disposed in a series of groups extending along the meat cutting portion of the path of said blade, said frame being provided with an opening therein adjacent said rollers on the inside of the path of movement of said blade for receiving a piece of meat cut from a larger body of meat by said blade, and means connected to said wheel for driving said wheel to move said blade along said path.

8. Meat cutting apparatus comprising a frame, a rotatable drive wheel on said frame, an endless flexible knife blade disposed in contact with a portion of the periphery of said wheel, a series of concave roller seats on said frame directed away from said wheel, a plurality of guide rollers rotatably mounted on said frame in said seats for contacting the inside surface of said blade to guide said blade along the meat cutting portion of its path, said frame being provided with an opening therein adjacent said seats on the inside of the path of movement of said blade for receiving a piece of meat cut from a body of meat by said blade, and means connected to said wheel for driving said wheel to move said blade along said path.

9. Meat cutting apparatus for making a curved cut in a body of meat comprising a frame having a rear wall provided with a slot therein, a shaft extending through said slot, a drive wheel fixed to said shaft in front of said rear wall, a curved guard member connected to an edge portion of said frame spaced from said wheel, a curved support member on said frame inwardly of said guard member and cooperating with said guard member to define a narrow blade passageway, the front walls of said members being tapered rearwardly away from said passageway and said frame being provided with a large opening inwardly of said support member to permit movement of said members through a cut in a body of meat, said support member being formed with a series of concave roller seats extending along the surface thereof facing said guard member, a plurality of independently rotatable guide rollers mounted in said seats for rotation about axes extending generally parallel to said shaft with said rollers being arranged in groups of coaxial rollers, an endless flexible knife blade protruding from the front end of said passageway and having its inner surface disposed in contact with portions of the peripheries of said wheel and said rollers, means on said frame for adjusting said shaft along said slot toward and away from said rollers to regulate the tension in said blade, and power means connected to said shaft for rotating said wheel to drive said blade.

References Cited in the file of this patent

UNITED STATES PATENTS

| | | |
|---|---|---|
| 1,083,219 | Sawyer | Dec. 30, 1913 |
| 1,424,133 | Johnson | July 25, 1922 |
| 1,936,688 | Rieske et al. | Nov. 28, 1933 |
| 1,993,899 | Rieske | Mar. 12, 1935 |
| 2,510,173 | Harter | June 6, 1950 |
| 2,621,693 | Grills | Dec. 16, 1952 |